United States Patent
Doughty et al.

(10) Patent No.: US 11,448,348 B2
(45) Date of Patent: Sep. 20, 2022

(54) BACKFLOW PREVENTION ASSEMBLY HAVING A VARIABLE LAY-LENGTH AND ORIENTATION

(71) Applicant: Watts Regulator Co., North Andover, MA (US)

(72) Inventors: Jason Doughty, Fitchburg, MA (US); Ian David Baynes, Merrimac, MA (US); Joseph Michael Burke, Deerfield, NH (US); Frank DiBenedetto, North Andover, MA (US); Muhannad A. Bagegni, Pelham, NH (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 17/148,115

(22) Filed: Jan. 13, 2021

(65) Prior Publication Data
US 2021/0131592 A1    May 6, 2021

Related U.S. Application Data

(63) Continuation of application No. 16/450,051, filed on Jun. 24, 2019, now Pat. No. 10,914,412.
(Continued)

(51) Int. Cl.
*F16L 27/12* (2006.01)
*F16K 27/00* (2006.01)
(Continued)

(52) U.S. Cl.
CPC ............ *F16L 27/125* (2013.01); *F16K 15/18* (2013.01); *F16K 27/00* (2013.01); *F16L 15/02* (2013.01); *F16L 27/1273* (2019.08)

(58) Field of Classification Search
CPC ... F16L 27/125; F16L 27/127; F16L 27/1274; F16L 27/1273; F16L 15/02; F16K 27/00; F16K 15/08
See application file for complete search history.

(56) References Cited

U.S. PATENT DOCUMENTS

| | | | | |
|---|---|---|---|---|
| 213,394 A ‡ | 3/1879 | Cornwall | ............... | F16K 15/042 |
| | | | | 137/51 |
| 2,310,586 A | 2/1943 | Lohman | | |

(Continued)

FOREIGN PATENT DOCUMENTS

| | | |
|---|---|---|
| CN | 110081212 A | 8/2019 |
| DE | 1925477 | 12/1970 |

(Continued)

OTHER PUBLICATIONS

Zurn Wilkins 300AR Series, Backflow Preventor Order Form No. 480-060, 4/17.‡

(Continued)

*Primary Examiner* — Kevin L Lee
(74) *Attorney, Agent, or Firm* — Day Pitney LLP; George N. Chaclas

(57) ABSTRACT

A backflow prevention assembly is configurable with varying lay-lengths and orientations. The assembly includes coupling assemblies and valve bodies that adjust in length and/or rotation to allow for the varying lay-lengths and orientations of the backflow prevention valves and assemblies with and without certification. A coupling assembly is connected to a backflow prevention valve and includes an outer sleeve and an inner sleeve that is slidingly received within the outer sleeve. The lay-length is adjusted by slidably moving the inner and outer sleeves with respect to one another.

13 Claims, 13 Drawing Sheets

Related U.S. Application Data

(60) Provisional application No. 62/691,037, filed on Jun. 28, 2018.

(51) Int. Cl.
*F16K 15/18* (2006.01)
*F16L 15/02* (2006.01)

(56) References Cited

U.S. PATENT DOCUMENTS

| | | | |
|---|---|---|---|
| 2,827,921 A | 3/1958 | Sherman et al. | |
| 3,173,439 A | 3/1965 | Griswold et al. | |
| 3,189,037 A | 6/1965 | Modesto | |
| 3,429,291 A | 2/1969 | Hoffman | |
| 3,837,357 A | 9/1974 | Slaughter | |
| 3,837,358 A | 9/1974 | Zieg et al. | |
| 3,859,619 A | 1/1975 | Ishihara et al. | |
| 3,896,850 A | 7/1975 | Waltrip | |
| 3,996,962 A | 12/1976 | Sutherland | |
| 4,014,284 A | 3/1977 | Read | |
| 4,244,392 A | 1/1981 | Griswold | |
| 4,416,211 A | 11/1983 | Hoffman | |
| 4,489,746 A | 12/1984 | Daghe et al. | |
| 4,523,476 A | 6/1985 | Larner | |
| 4,618,824 A | 10/1986 | Magee et al. | |
| 4,667,697 A | 5/1987 | Crawford | |
| 4,777,979 A | 10/1988 | Twerdochlib | |
| 4,920,802 A | 5/1990 | McMullin et al. | |
| 4,945,940 A | 8/1990 | Stevens | |
| 5,008,841 A | 4/1991 | McElroy | |
| 5,024,469 A ‡ | 6/1991 | Aitken | F16L 27/12 285/302 |
| 5,125,429 A | 6/1992 | Ackroyd et al. | |
| 5,236,009 A | 8/1993 | Ackroyd | |
| 5,404,905 A | 4/1995 | Lauria | |
| 5,425,393 A | 6/1995 | Everett | |
| 5,520,367 A | 5/1996 | Stowers | |
| 5,551,473 A | 9/1996 | Lin et al. | |
| 5,566,704 A | 10/1996 | Ackroyd et al. | |
| 5,669,405 A | 9/1997 | Engelmann | |
| 5,713,240 A | 2/1998 | Engelmann | |
| 5,901,735 A | 5/1999 | Breda | |
| 6,123,095 A | 9/2000 | Kersten et al. | |
| 6,170,510 B1 | 1/2001 | King et al. | |
| 6,343,618 B1 | 2/2002 | Britt et al. | |
| 6,349,736 B1 | 2/2002 | Dunmire | |
| 6,374,849 B1 | 4/2002 | Howell | |
| 6,471,249 B1 ‡ | 10/2002 | Lewis | F16L 27/12 285/22 |
| 6,513,543 B1 | 2/2003 | Noll et al. | |
| 6,581,626 B2 | 6/2003 | Noll et al. | |
| 6,659,126 B2 ‡ | 12/2003 | Dunmire | E03C 1/106 137/27 |
| 6,675,110 B2 | 1/2004 | Engelmann | |
| 7,506,395 B2 | 3/2009 | Eldridge | |
| 7,934,515 B1 | 5/2011 | Towsley et al. | |
| 8,220,839 B2 ‡ | 7/2012 | Hall | F16L 25/12 285/302 |
| 8,997,772 B2 ‡ | 4/2015 | Noll | F16K 43/001 137/15 |
| 9,091,360 B2 | 7/2015 | Frahm | |
| 9,546,475 B2 | 1/2017 | Lu | |
| 9,995,605 B2 | 6/2018 | Konno et al. | |
| 10,132,425 B2 | 11/2018 | Monte | |
| 10,561,874 B2 | 2/2020 | Williams et al. | |
| 10,719,904 B2 | 7/2020 | Yasumuro et al. | |
| 10,883,893 B2 | 1/2021 | Shaw et al. | |
| 10,914,412 B2 * | 2/2021 | Doughty et al. | F16L 15/02 |
| 10,962,143 B2 | 3/2021 | Cis et al. | |
| 2003/0000577 A1 | 1/2003 | Noll et al. | |
| 2004/0045604 A1 | 3/2004 | Dunmire et al. | |
| 2004/0107993 A1 | 6/2004 | Stephens | |
| 2005/0092364 A1 | 5/2005 | Furuya et al. | |
| 2005/0199291 A1 | 9/2005 | Price et al. | |
| 2006/0196542 A1 | 9/2006 | Yen | |
| 2007/0181191 A1 | 8/2007 | Wittig et al. | |
| 2007/0193633 A1 | 8/2007 | Howell et al. | |
| 2007/0240765 A1 | 10/2007 | Katzman et al. | |
| 2008/0289567 A1 | 11/2008 | Gordon | |
| 2009/0194719 A1 | 8/2009 | Mulligan | |
| 2017/0023141 A1 | 1/2017 | Andersson | |
| 2019/0043157 A1 | 2/2019 | Yasumuro et al. | |
| 2019/0162341 A1 ‡ | 5/2019 | Chiproot | F16L 25/04 |
| 2019/0323618 A1 | 10/2019 | Fletcher et al. | |
| 2020/0141612 A1 | 5/2020 | Thibodeaux | |
| 2021/0172157 A1 | 6/2021 | Burke et al. | |
| 2021/0230850 A1 | 7/2021 | Bouchard et al. | |

FOREIGN PATENT DOCUMENTS

| | | |
|---|---|---|
| DE | 3525261 | 11/1985 |
| DE | 202014102568 U1 | 9/2015 |
| JP | 2002213629 A | 7/2002 |
| WO | 2003060459 A1 | 7/2003 |
| WO | 2020023584 A1 | 1/2020 |

OTHER PUBLICATIONS

Lead Free Master Series LF870V product specifications pages, ES-F-LF-870V 1826, 2018.‡

Watt TK-99E Backflow Preventer Test Kit product specifications and test information, IS-TK99E 0829, 2009.‡

Lead Free Master Series LF870V product specifications pages, ES-F-LF-870V 1826, 2018, 4 pages.

Watt TK-99E Backflow Preventer Test Kit Product Specifications and Test Information, IS-TK99E 0829, 2009, 4 pages.

Zurn Wilkins 300AR Series, Backflow Preventor Order Form No. 480-060, 4/17, 2 pages.

Watts Water Technologies Company, Installation, Maintenance & Repair Series 909, LF909, 909RPDA, LF909RPDA, 2016, 8 pages.

Watts Regulator Co., Watts ACV 113-6RFP Floor Protection Shutdown Valve for Health Hazard Applications, 2020, 4 pages.

European Search Report for European Patent Application No. 20192133.5 dated Feb. 1, 2021, 9 pages.

Ames Fire & Waterworks, division of Watts Industries, F-A-Spools/Flanges, 2001, 4 pages.

Watts, S-RetroFit-Simple, 2017, 2 pages.

Apollo Valves, Apollo backflow preventer in-line "R" retrofit series, 2 pages.

*Zurn Industries, LLC vs. Conbraco Industries, Inc.*, Complaint for patent infringement, United States District Court for the Center District of California Western Division, Case No. 2:16-CV-5656, Jul. 29, 2016; 5 pages.

Wilkins Company, Model 375/475MS Series, Installation, Maintenance and Instruction Sheet, 2006, 1 page.

Watts Water Company, Series 909RPDA for Health Hazard Applications, 2016, 4 pages.

Watts Regulator Co., WATTS ACV 113-6RFP Flood Protection Shutdown Valve for Health Hazard Applications, 2020, 4 pages.

Wilkins Model 420 XL Lead-Free pressure Vacuum Breakers 1/2", 3/4", and 1", pp. 60-70.

Apollo Valves PVB4A Series Installation, Operation and Maintenance Manual for Model PVB4A 1/2"-2" Pressure Vacuum Breaker Backflow Preventer, dated Jan. 11, 2012, 12 pages.

Apollo Valves PVB4A Series Installation, Operation, and Maintenance Manual, copyright May 2009, 9 pages.

Watts Water Technologies Company Brochure Es LF800M4QT for Health Hazard Applications Lead Free Series LF8 M4QT Anti-Siphon Vacuum Breakers Sizes 1/2"-2", copyright 2013, 4 pages.

Conbraco BFMMPVB Maintenance Manual for Series 4V-500 1/2"-2" Pressure Type VacuAppolloum Breaker, 04/02, Conbraco Industries, Inc., Matthews, North Carolina 28106, 6 pages Series_4V.

Watts, "Double Check Valve Assembly Backflow Preventers, Bronze," Article 1, 2021, 6 pages.

Watts, "Reduced Pressure Zone Assembly Backflow Preventers, Bronze Body, Sizes 1/4-2 IN," Article 1, 2021, 16 pages.

(56) References Cited

OTHER PUBLICATIONS

Miscellaneous Communication issued in European patent application No. 20211811.3, dated Apr. 5, 2021, 8 pages.
Office Action issued in corresponding Chinese patent application No. 20201920527.3, dated Mar. 10, 2021, 1 page (translation unavailable).
International Search Report and Written Opinion issued in corresponding international patent application No. PCT/US2021/046208, dated Dec. 1, 2021, 8 pages.

\* cited by examiner
‡ imported from a related application

BACKFLOW PREVENTION ASSEMBLY HAVING A VARIABLE LAY-LENGTH AND ORIENTATION

RELATED APPLICATION

This application claims priority to and is a continuation of U.S. Non-provisional Ser. No. 16/450,051, filed Jun. 24, 2019, now U.S. Pat. No. 10,914,412 issued on Feb. 9, 2021 and entitled Backflow Prevention Assembly Having A Variable Lay-Length And Orientation, which in turn claims priority to and benefit of U.S. provisional patent application, Ser. No. 62/691,037, filed Jun. 28, 2018 and entitled "Backflow Prevention Assembly Having A Variable Lay-Length And Orientation," of which the entire contents of each is incorporated hereby by reference in their entirety for all purposes.

FIELD OF THE DISCLOSURE

The subject disclosure relates to backflow prevention valves and assemblies, and more particularly to backflow prevention valves and assemblies having a variable lay-length and orientation.

BACKGROUND

In many water systems, backflow prevention valves and assemblies allow fluid and even solids to flow in a desired direction (i.e., a forward direction). As backsiphonage or backflow may present contamination and health problems, the backflow prevention valves and assemblies prevent flow in an undesired direction (i.e., a backward or reverse direction). For example, backflow prevention valves and assemblies are installed in buildings, such as residential homes, and commercial buildings and factories, to protect public water supplies by preventing the reverse flow of water from the buildings back into the public water supply.

A typical backflow prevention assembly includes an inlet shutoff valve and an outlet shutoff valve with a backflow prevention valve extending between the inlet and outlet shutoff valves. Many different configurations of backflow prevention assemblies are commercially available, each being different in configuration and resulting lay-length. As used herein, "lay-length" is the distance between the ends of the backflow prevention valve or, if the valve is included in an assembly, the distance between the distal ends of the shutoff valves.

The backflow prevention valve and shutoff valves of the assemblies are normally threaded or bolted together with a fixed lay-length. As such, if a retrofit or replacement of an existing valve or assembly is desired, spools and spacing flanges are often required to be added to the replacement valve or assembly so that the lay-length of the replacement valve or assembly will match the lay-length of the existing valve or assembly in order to fit into the space left by the existing valve or assembly in the fluid system. Such spools require advance measurement, planning and ordering of parts that can create delay and expense in the retrofit process. To accommodate varying lay-lengths, the spools may be cut or manufactured to a custom length.

Additionally, backflow prevention assemblies require certification by various entities so that in-field reconfiguration is not possible while maintaining the certification. One exemplary certification organization that protects drinking water supplies is the Foundation for Cross-Connection Control and Hydraulic Research established by the University of Southern California. The approval process requires a laboratory evaluation in which the design is reviewed and then tested in a laboratory. For example, one of the important tests is the pressure loss across the backflow prevention assembly. The backflow prevention assembly must maintain pressure loss and other parameters within allowed limits. Life cycle and back pressure tests are also required. The approval process also requires an extensive one-year of field evaluation in which the subject assemblies are taken apart to insure no deformation, damage or problems occurred that could cause poor performance. Every three years, the certification for the backflow prevention assembly must be renewed. As such, one cannot simply disassemble and reconfigure a backflow prevention assembly in the field without voiding its certification.

SUMMARY

The present disclosure provides a new and improved backflow prevention valve and assembly having a variable lay-length that quickly and easily adjusts to the fluid system for easy retrofit and installation without need of a custom fit, fixed-length spool. The new and improved backflow prevention valve and assembly and associated variable-length coupling assemblies can be pre-certified by the manufacturer for adjustment of the lay-length during installations in the field in retrofit applications. Thus, in-field adjustments to lay-length may be made without additional parts while maintaining certification.

Among other aspects and advantages, the new and improved backflow prevention valve and assembly of the present disclosure can accommodate self-adjustment while in service. For example, thermal expansion, seismic activity, movement related to thermal cycles like freezing and the like may create expansion and contraction forces on the backflow prevention valve and assembly which the variable lay-length absorbs by the inherent ability to freely lengthen and shorten.

According to one aspect of the present disclosure, the variable lay-length is obtained using coupling assemblies that can vary in longitudinal length. According to another aspect, the variable lay-length is obtained using a valve housing that can vary in longitudinal length.

According to a further aspect of the present disclosure, the variable length coupling and the variable length valve housing are also rotatable about a longitudinal axis. The rotation allows for an orientation of the backflow prevention valve and assembly of the present disclosure to be varied, accommodates easier installation during retrofit applications, and permits more self-adjustment while in service.

According to a further aspect of the present disclosure, there is a backflow prevention assembly, comprising: a first shutoff valve; a second shutoff valve; an outer sleeve connected to one of the first and second shutoff valves; an inner sleeve connected to the other of the first and second shutoff valves and slidingly received within the outer sleeve such that a lay-length of the backflow prevention assembly can be varied; a fluid seal positioned between the inner sleeve and the outer sleeve; and a check valve, connected to the inner sleeve, configured to allow fluid flow through the backflow prevention assembly in a single direction.

According to a further aspect of the present disclosure, there is a backflow prevention assembly, comprising: a first shutoff valve; a second shutoff valve; a first backflow prevention valve connected between the first and second shutoff valves; and a coupling assembly connected to at least one of the first backflow prevention valve, the first shutoff valve and the second shutoff valve, wherein the coupling assembly, the first backflow prevention valve and the first and second shutoff valves define a lay-length of the backflow prevention assembly. The coupling assembly includes: a first end; a second end; an outer sleeve extending from the first end; an inner sleeve extending from the second end and slidingly received within the outer sleeve such that a distance between the first and second ends of the coupling assembly can be varied to adjust the lay-length of the backflow prevention assembly; and a fluid seal positioned between the inner sleeve and the outer sleeve.

According to a further aspect of the present disclosure, there is a backflow prevention assembly having a variable lay-length, comprising: a first shutoff valve; a second shutoff valve; a first backflow prevention valve connected between the first shutoff valve and the second shutoff valve; and a coupling assembly, connected to at least one of the first backflow prevention valve. The first shutoff valve or the second shutoff valve, includes: a first end; a second end; an outer sleeve extending from the first end; an inner sleeve extending from the second end and slidingly received within the outer sleeve; and a fluid seal positioned between the inner sleeve and the outer sleeve, wherein the lay-length is varied by sliding the inner and outer sleeves with respect to one another along a common axis.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures:

FIG. 1b illustrates another configuration of the backflow prevention assembly of FIG. 1a;

FIG. 1c illustrates still another configuration of the backflow prevention assembly of FIG. 1a;

FIG. 1d illustrates still another configuration of the backflow prevention assembly of FIG. 1a;

DETAILED DESCRIPTION

Figure 1A:
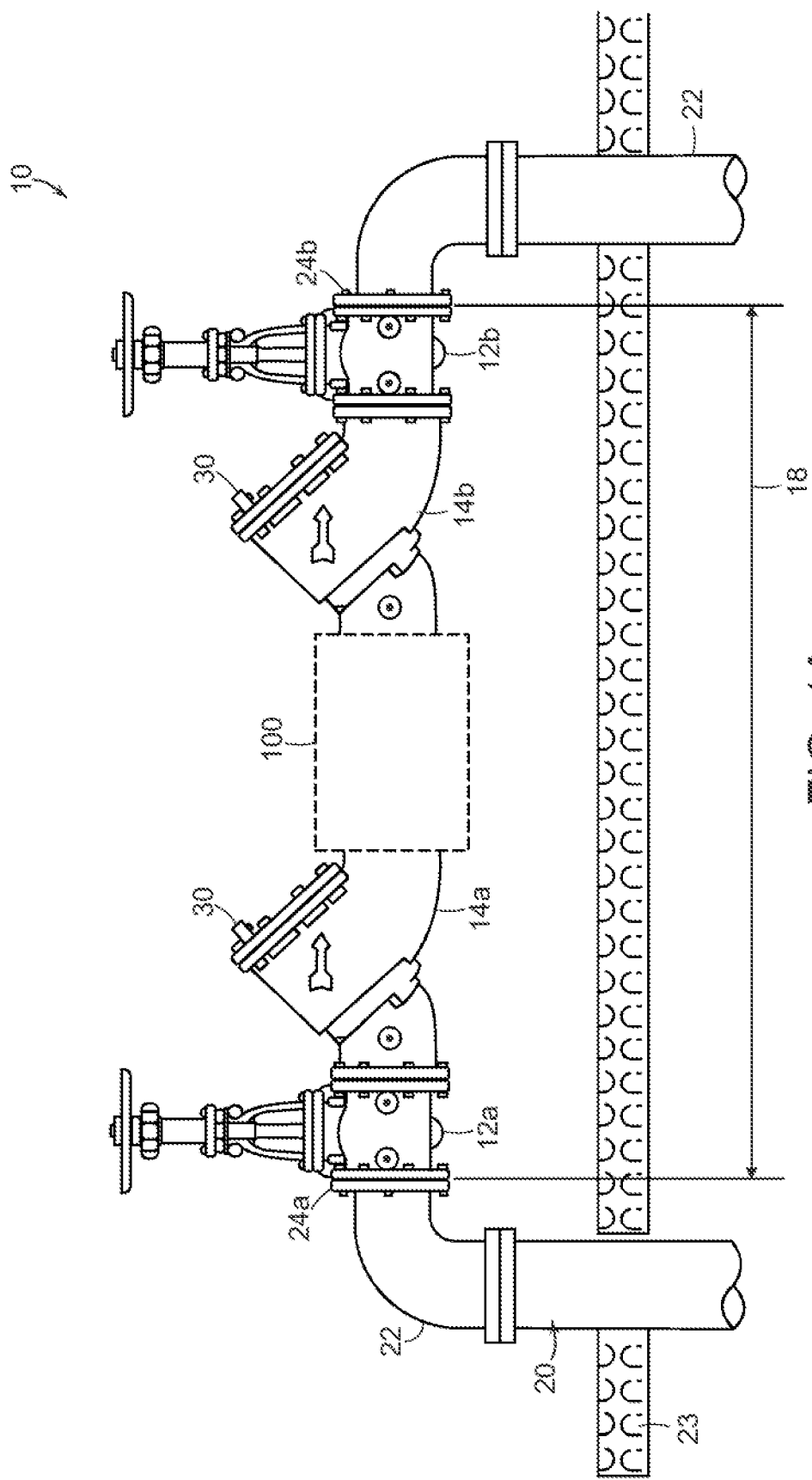
FIG. 1a illustrates a first configuration of an exemplary embodiment of a backflow prevention assembly in accordance with the subject disclosure.

This application is a non-provisional application claiming priority from U.S. provisional patent application, Ser. No. 62/691,037, filed Jun. 28, 2018 and entitled "Backflow Prevention Assembly Having A Variable Lay-Length And Orientation," the entire contents of which is incorporated by reference herein for all purposes.

The subject technology overcomes many of the prior art problems associated with backflow prevention assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

In brief, the subject technology is directed to backflow prevention valves and assemblies that have varying lay-lengths and orientations and may include coupling assemblies and valve bodies that adjust in length and/or rotation to allow the varying lay-lengths and orientations of the backflow prevention valves and assemblies with and without certification.

Referring now to FIG. 1a, there is shown a backflow prevention assembly 10 in accordance with the subject technology. The backflow prevention assembly 10 is installed in a fluid system 20 (e.g., a water supply for a building mounted at a location in the ground 23). The fluid system 20 includes fluid conduits that carry fluid in a forward direction (e.g., left to right in FIG. 1a) with the backflow prevention assembly 10 preventing flow in the backward direction (e.g., right to left in FIG. 1a). The fluid system 20 will include strainers, meters and other typical components that are not shown in FIG. 1a. The fluid system 20 has pipes 22 that terminate in opposing ends fitted with mounting flanges 24a, 24b. Typically, the distance between the mounting flanges 24a, 24b is fixed so that when installing the backflow prevention assembly 10, a lay-length 18 of the backflow prevention assembly 10 should be matched to the distance between the mounting flanges 24a, 24b. The backflow prevention assembly 10 may be mounted horizontally or vertically as well as in parallel with another component such as even another backflow prevention assembly.

The backflow prevention assembly 10 can be modular and may include identical or functionally similar components so that some components may be interchanged. The backflow prevention assembly 10 includes an inlet shutoff valve 12a and an outlet shutoff valve 12b. Each shutoff valve 12a, 12b couples to a respective flange 24a, 24b of the fluid system 20. The shutoff valves 12a, 12b may be interchangeable. The backflow prevention assembly 10 also includes two backflow prevention valves 14a, 14b, also referred to as "check valves," connected to a respective shutoff valve 12a, 12b. The two backflow prevention valves 14a, 14b may be interchangeable.

Figure 1B:
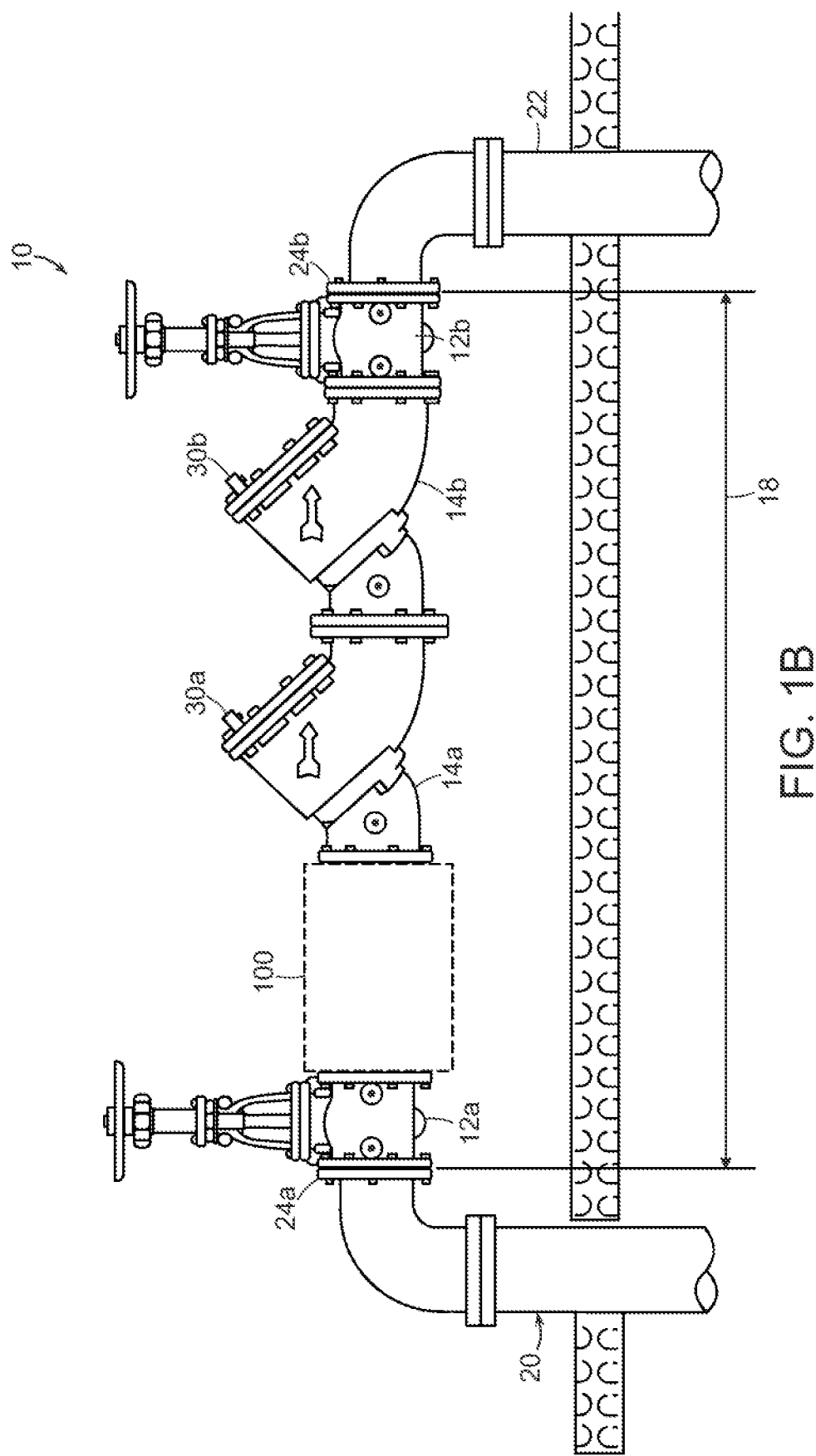
Figure 1C:
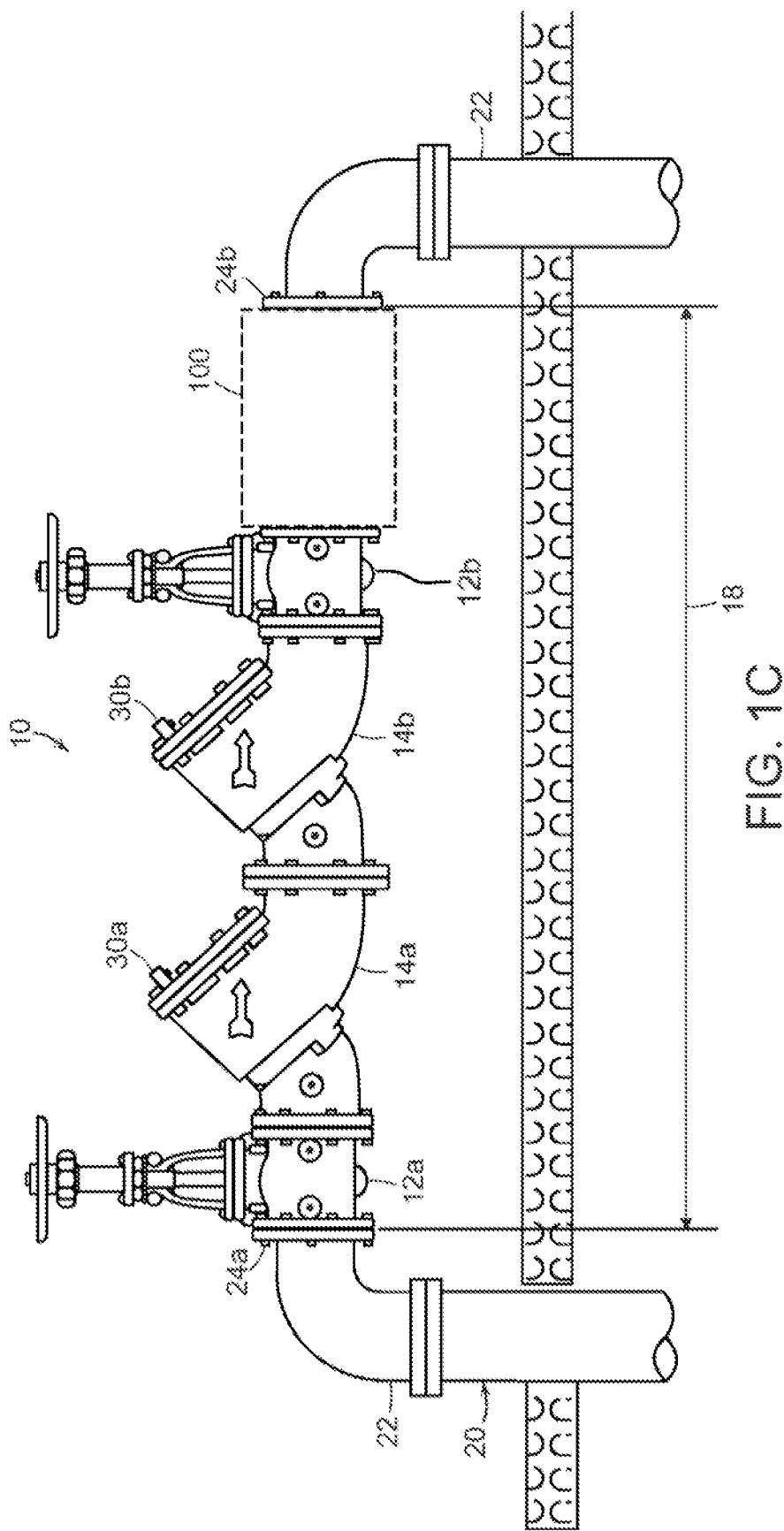
Figure 1D:
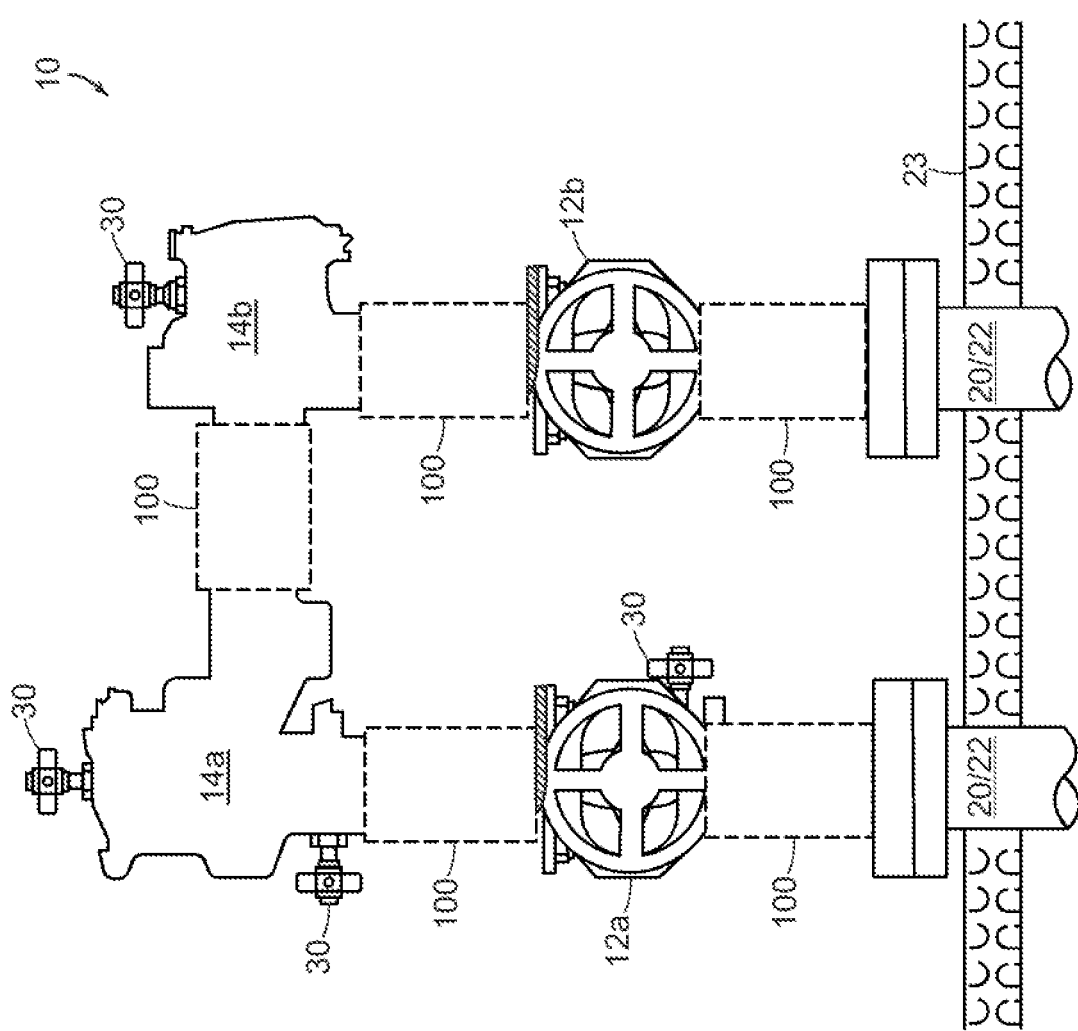
Figure 1E:
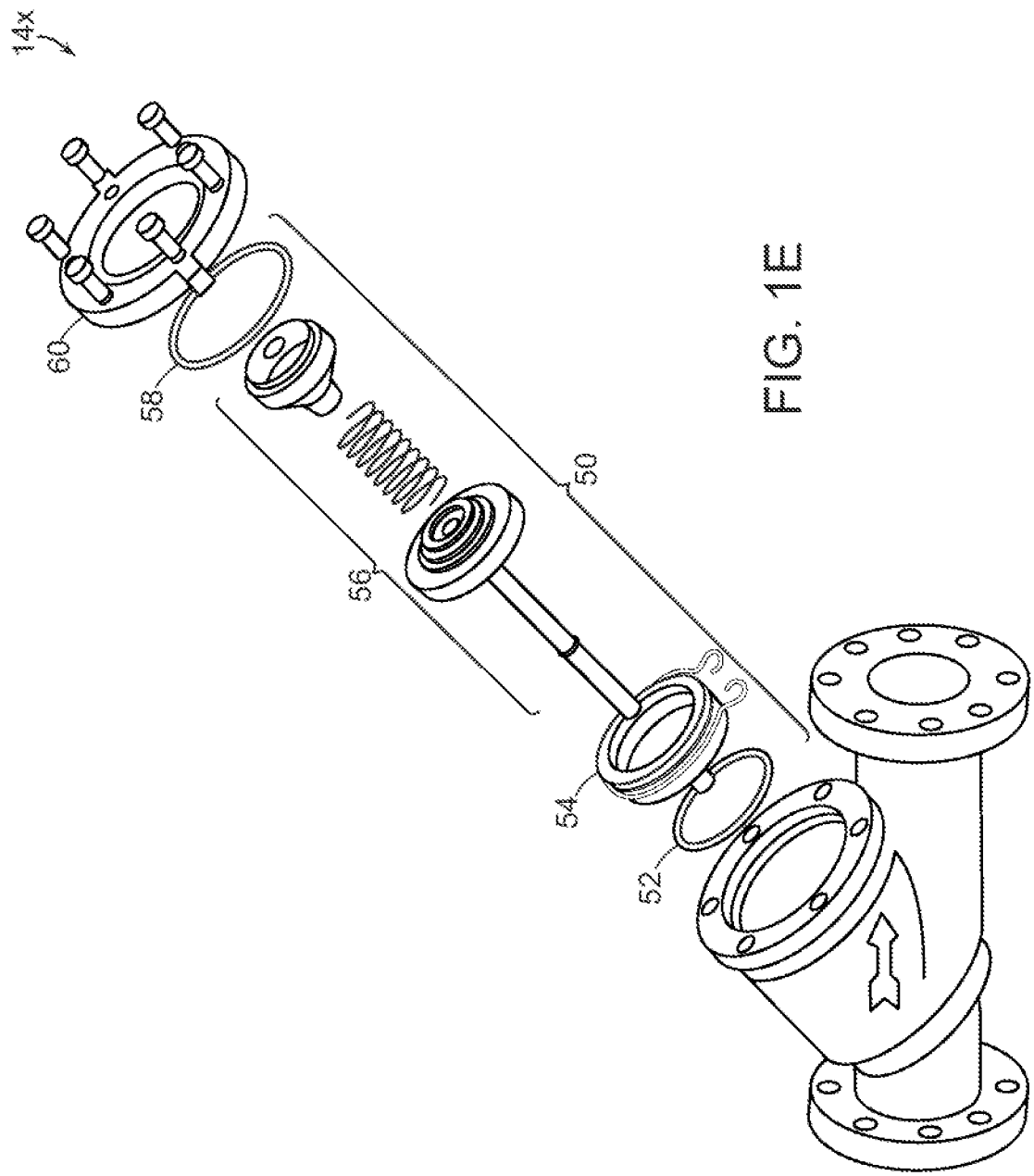
FIG. 1e is an exploded view of an exemplary embodiment of a backflow prevention valve for use in the assembly shown in FIGS. 1a through 1d.

An exemplary embodiment of a backflow prevention valve 14x, as known to one of ordinary skill in the art, is shown, in an exploded view, in FIG. 1e. Accordingly, a check valve assembly 50 includes a seat O-ring 52, a seat 54, a disk and spring assembly 56, a cover O-ring 58 and a cover 60. The seat O-ring 52 and the cover O-ring 58 provide a fluid seal.

Owing to the fact that a backflow prevention assembly is critical for water safety, it is tested, for example, annually, to assure that it is in proper operating condition. Specifically, as is known, fluid pressure measurements are taken at specified locations in the backflow prevention assembly 10. To facilitate these pressure measurements, the backflow prevention assembly 10 includes a number of test cocks 30, each of which includes a ball valve, and which is threadably connected to couple with a fluid path within the backflow prevention assembly 10 via a corresponding test cock port (not shown).

In a known implementation, four test cocks are located on the backflow prevention assembly 10 in order to allow for temporarily attaching measuring equipment to measure the flow to ensure that the backflow prevention assembly 10 is functioning correctly. Thus, for example, a test cock may be provided to measure the pressure coming into the backflow prevention assembly 10; another test cock measures the pressure just before a first check valve; a third test cock measures the pressure right after the first check valve; and a fourth test cock measures the pressure right after a second check valve.

While not all test cocks 30 are shown in the Figures, a test cock 30a is shown as provided on the backflow prevention valve 14a and a test cock 30b is provided on the backflow prevention valve 14b. One of ordinary skill in the art will understand where other test cocks are placed in order to provide for a testable backflow prevention assembly 10.

In the exemplary embodiment of the assembly 10 shown in FIG. 1a, a variable length coupling assembly 100 extends between the two check valves 14a, 14b. The variable length of the coupling assembly 100 allows the overall lay-length 18 of the backflow prevention assembly 10 to be adjusted to match the fixed distance between the mounting flanges 24a, 24b for easy and quick installation. In the exemplary embodiment shown, the coupling assembly 100 also is rotatable about its length to allow for efficient alignment of the components.

The backflow prevention assembly 10 being modular allows for several varying configurations. In FIG. 1b, for example, the coupling assembly 100 extends between the inlet shutoff valve 12a and the check valve 14a. Similarly, the coupling assembly 100 could be located between the check valve 14b and the outlet shutoff valve 12b. For another example shown in FIG. 1c, the coupling assembly 100 extends from the outlet shutoff valve 12b for connection to the mounting flange 24b to act as an adjustable coupling. Alternatively, the coupling assembly 100 could extend from the inlet shutoff valve 12a for connection to the mounting flange 24a.

Figure 3A:
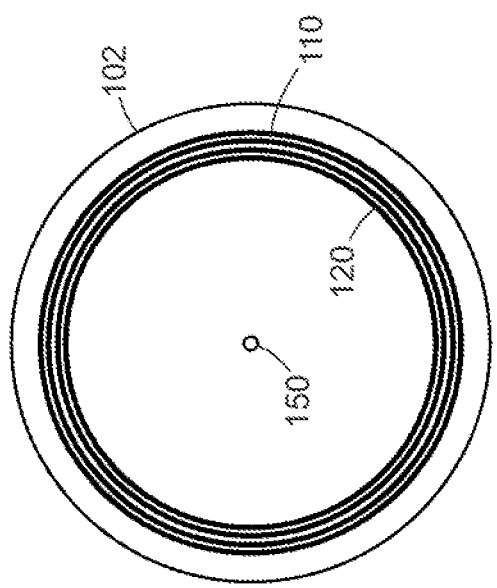
FIG. 3a illustrates a sectional view of the coupling taken along line 3-3 of FIG. 2.
Figure 2:
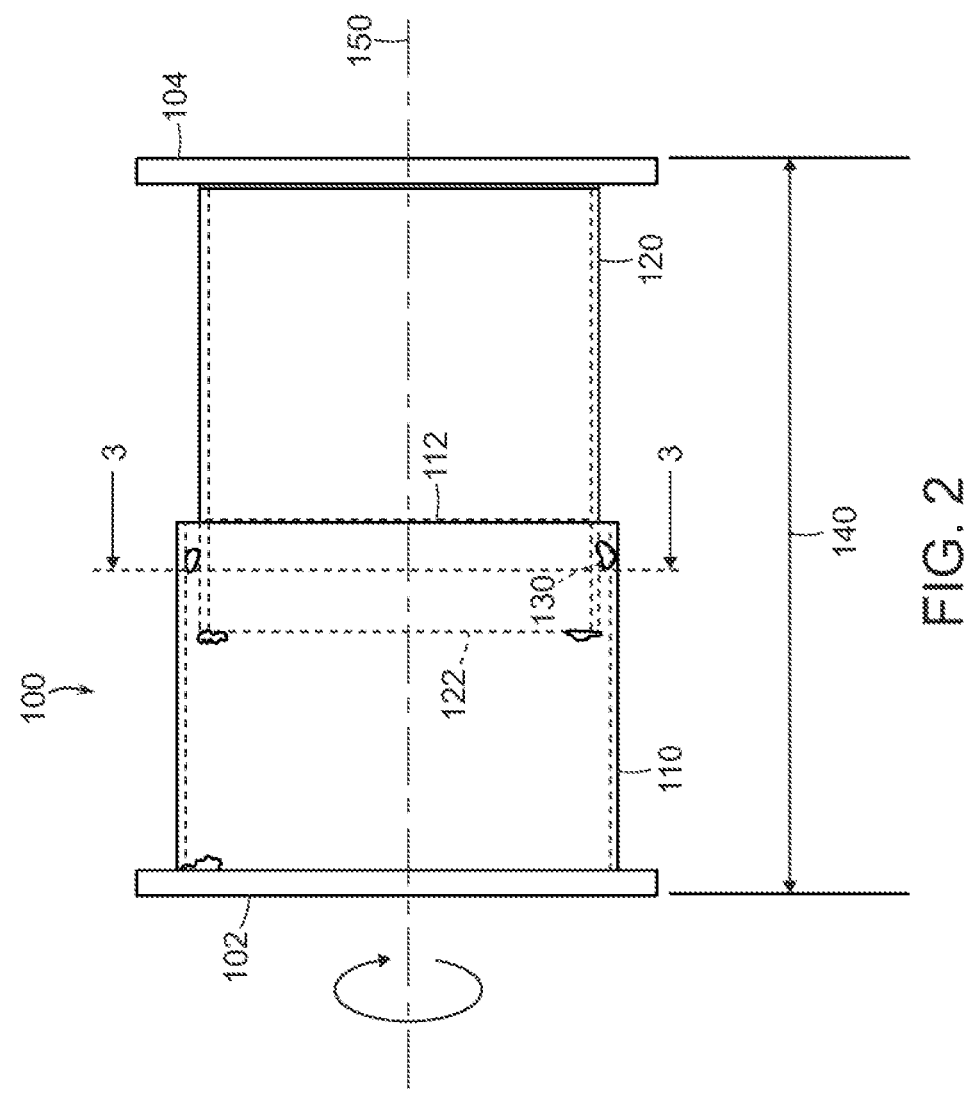
FIG. 2 illustrates an exemplary embodiment of a coupling in accordance with the subject technology for use in the assembly shown in FIGS. 1a through 1 d.

For another example, as shown in FIG. 1d, the coupling assembly 100 can be provided to extend vertically, with respect to the ground 23, between the input and its respective shutoff valve 12a and the output and its respective shutoff valve 12b. In addition, the coupling assembly 100 can be vertically placed between the shutoff valve 12a and the check valve 14a and between the shutoff valve 12b and the check valve 14b. Further, and similar to the configuration in FIG. 1a, the coupling assembly 100 can be placed horizontally between the check valve 14a and the check valve 14b. It should be noted that while two vertically-oriented sections are shown in FIG. 1d with the coupling assemblies 100, one of ordinary skill in the art will understand that it is not necessary that both be constructed as such and the claims are not intended to be limited to the embodiment shown in FIG. 1d An exemplary embodiment of the coupling assembly 100 is shown in FIGS. 2 and 3a. The coupling includes first and second ends 102, 104, an outer sleeve 110 extending from the first end 102, and an inner sleeve 120 extending from the second end and slidingly received within the outer sleeve such that a length 140 between the first and the second ends 102, 104 of the coupling assembly 100 can be varied to vary the lay-length 18 of the backflow prevention assembly 10 of FIGS. 1a through 1d. The outer sleeve 110 has an open distal end 112 receiving an open distal end 122 of the inner sleeve. A fluid seal 130 is positioned between the inner sleeve 120 and the outer sleeve 110 to provide a fluid-tight seal between the sleeves, yet allow sliding movement between sleeves. The fluid seal may comprise, for example, an O-ring 130. As discussed below, the present disclosure also includes the addition of one or more springs, or another type of biasing feature, in the coupling assembly 100 to cause the sleeves to be biased, or urged, away from one another along their common axis.

As shown in FIG. 3a, the sleeves 110, 120 have circular cross-sections so that the sleeves can rotate with respect to each other about a longitudinal axis 150 of the coupling assembly 100. In alternative embodiments, the sleeves may have non-circular cross-sections to prevent rotation with respect to one another. For example, in FIG. 3b the coupling assembly 100 is shown with an outer sleeve 110a and an inner sleeve 120a each having an oval-shaped cross-section that prevent rotation with respect to each other.

Figure 3B:
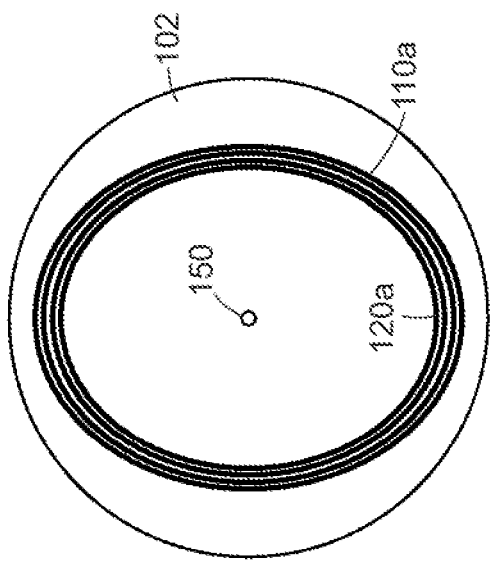
FIG. 3b illustrates a sectional view of another exemplary embodiment of a coupling in accordance with the subject technology for use in the assembly shown in FIGS. 1a through 1d.

In the exemplary embodiment of FIGS. 2 through 3b, the ends 102, 104 of the coupling assembly 100 comprise flanges for connection to the other components of the backflow prevention assembly 10 and/or the mounting flanges 24a, 24b of the fluid system 20. It should be noted, however, that the ends could take other forms to facilitate connection of the coupling assembly 100 to the backflow prevention assembly 10 and/or the fluid system 20. In addition, it should be understood that one or both of the ends 102, 104 of the coupling assembly 100 could be unitarily formed with the check valves 14a, 14b and/or the shutoff valves 12a, 12b. For example, the first end 102 and the outer sleeve 110 could be unitarily formed with the check valve 14a, and the second end 104 and the inner sleeve 120 could be unitarily formed with the check valve 14b.

Figure 4:
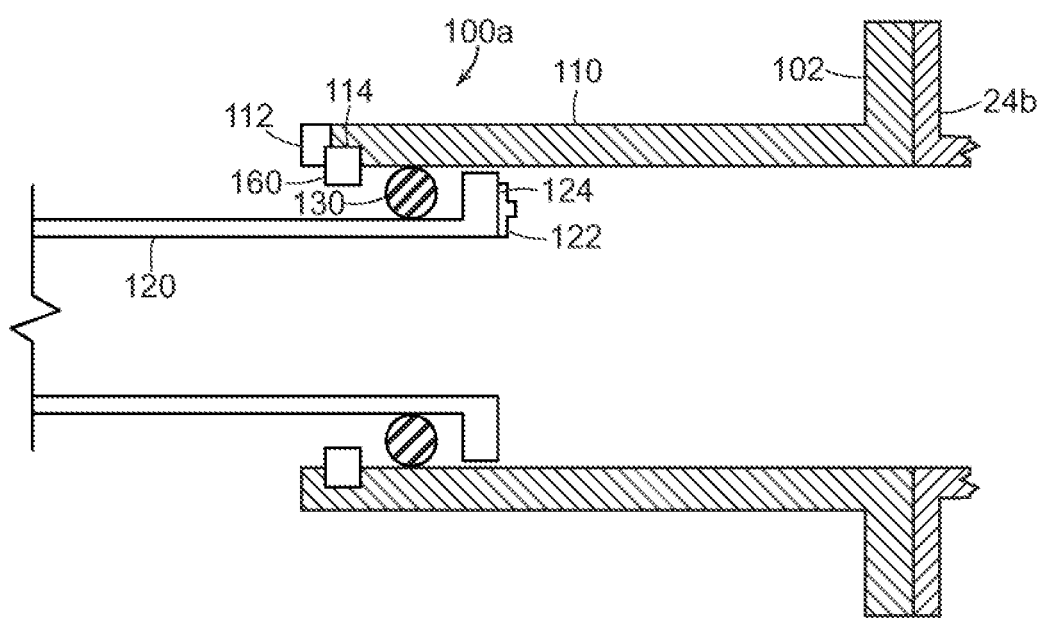
FIG. 4 illustrates a partial cross-sectional view of an exemplary embodiment of a coupling in accordance with the subject technology for use in the assembly shown in FIGS. 1a through 1d.

Referring now to FIG. 4, a partial cross-sectional view of an exemplary embodiment of a coupling assembly 100a in accordance with the subject technology is shown. The coupling assembly 100a is similar to the coupling assembly 100 of FIGS. 2 and 3a, but includes a snap ring 160 received in a radially inwardly facing groove 114 of the outer sleeve 110. The inner sleeve 120 includes a flange 124 at its distal end 122 that, in combination with the snap ring 160, holds the inner sleeve 120 within the outer sleeve 110. As discussed below, the present disclosure also includes the addition of one or more springs, or another type of biasing feature, in the coupling assembly 100a to cause the sleeves to be, or urged, away from one another along their common axis.

Figure 5:
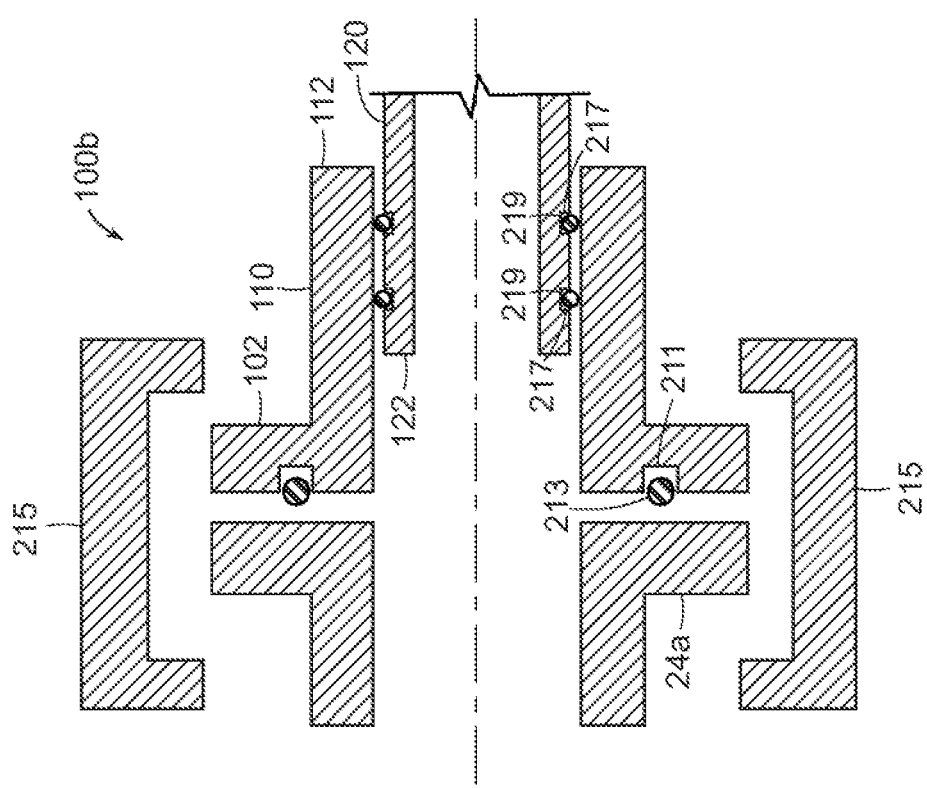
FIG. 5 illustrates a partial cross-sectional view of another exemplary embodiment of a coupling in accordance with the subject technology for use in the assembly shown in FIGS. 1a through 1d.

Referring now to FIG. 5, a partial cross-sectional view of another coupling assembly 100b in accordance with the subject technology is shown. The coupling assembly 100b is similar to the coupling assembly 100 of FIGS. 2 and 3a, but includes a groove 211 in the flange 102 for receiving an O-ring 213 to provide a fluid tight seal to the flange 1102. The coupling flange 102 and fluid system flange 24a may be tightly held together by one or more retaining clips 215 that snap onto the flanges 24a, 102. The inner sleeve 120 includes two radially outwardly facing annular channels 217 for retaining respective O-rings 219 to insure fluid tight sealing between the sleeves 120, 110. In this embodiment of the coupling assembly 100b, the sleeves 120, 110 are rotatable and slidable but a retention feature is not needed because the backflow prevention assembly 100 maximum installed length will not allow for the sleeves 120, 110 to be disengaged from one another. In an alternate approach, as would be understood by one of ordinary skill in the art, a clamp ring can be used in place of the retaining clip 215.

Figure 6:
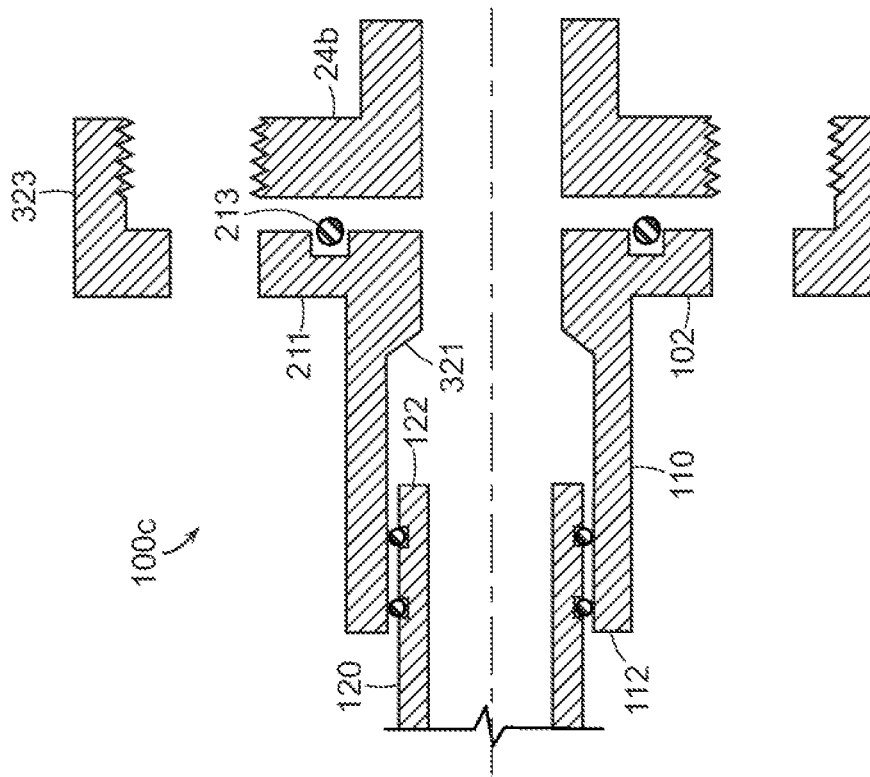
FIG. 6 illustrates a partial cross-sectional view of still another exemplary embodiment of a coupling in accordance with the subject technology for use in the assembly shown in FIGS. 1a through 1d.

Referring now to FIG. 6, a partial cross-sectional view of another coupling assembly 100c in accordance with the subject technology is shown. The coupling assembly 100c is similar to the coupling assembly 100 of FIGS. 2 and 3a, but the outer sleeve 110 includes a narrowed inner diameter that forms a minimum lay-length travel stop 321 for the inner sleeve 120. The flange 102 of the coupling assembly 100c is secured to the flange 24b using a threaded union nut 323.

Figure 7:
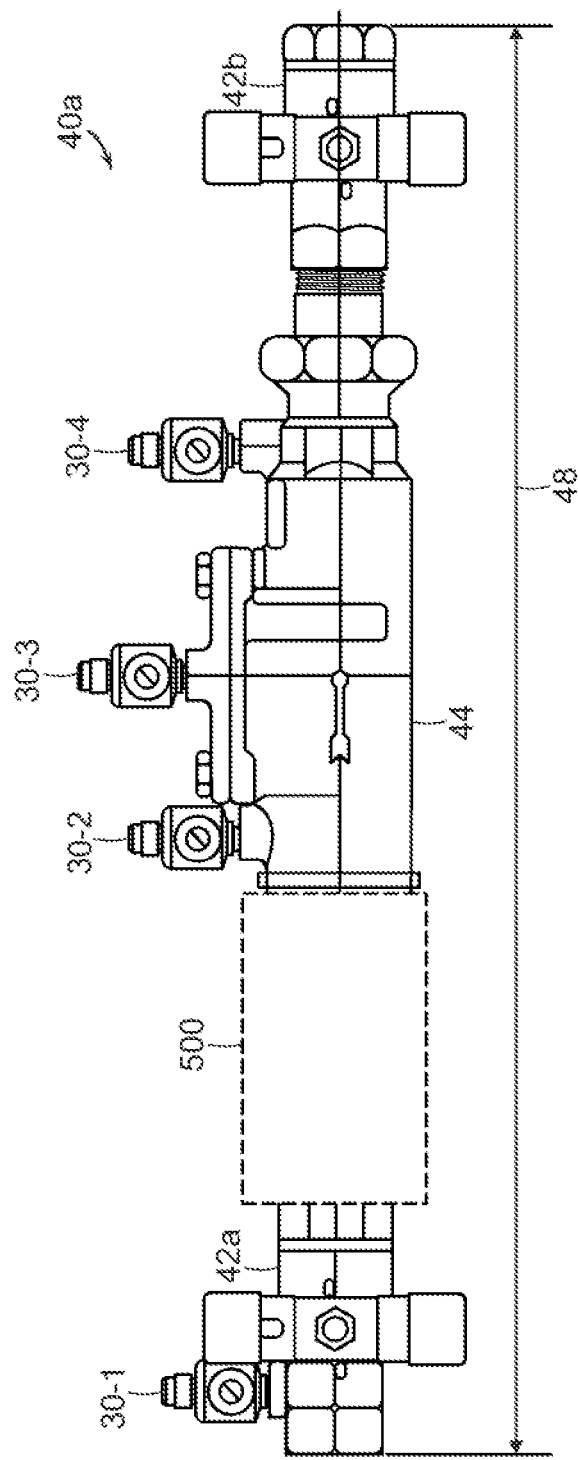
FIG. 7 illustrates another exemplary embodiment of backflow prevention assembly in accordance with the subject disclosure.
Figure 8:
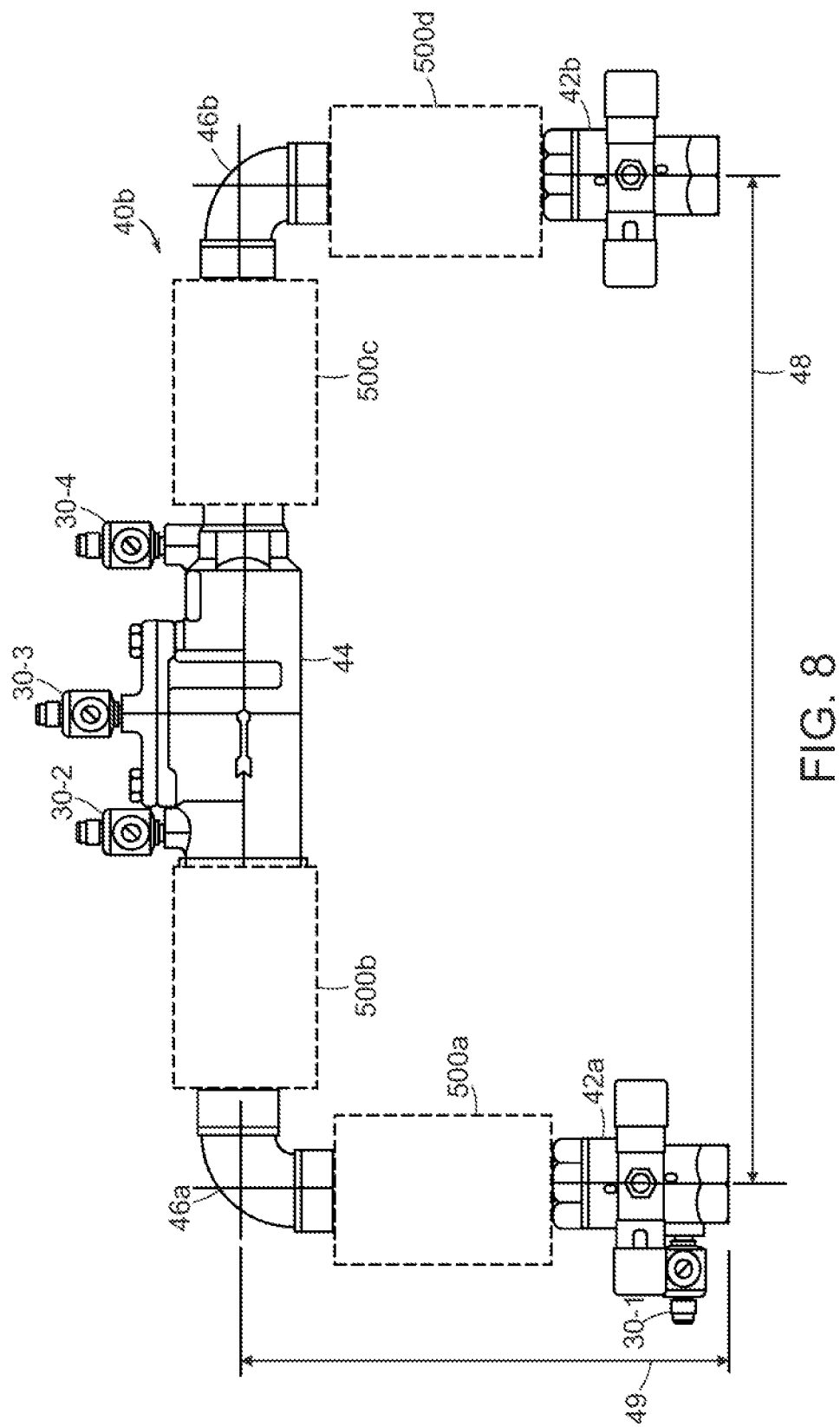
FIG. 8 illustrates a further exemplary embodiment of a backflow prevention assembly in accordance with the subject disclosure.

Referring now to FIGS. 7 and 8, additional embodiments of certified backflow prevention assemblies 40a, 40b, are shown, each having one or more variable length and/or rotatable coupling assembly 500 in accordance with the subject disclosure. Each coupling assembly 500 of FIGS. 7 and 8 is generally similar to the coupling assembly 100 of FIGS. 1a through 1d. Each of the backflow assemblies 40a, 40b includes a backflow prevention valve 44, a first shut-off valve 42a, and a second shut-off valve 42b. As can be seen from FIG. 8, an overall height 49 of the backflow prevention assembly 40b can be changed by adjusting the length of the coupling assemblies 500a, 500d. A lay-length 48 of the assembly can be changed by adjusting the length of one or both of the coupling assemblies 500b, 500c. In addition, the orientation of the assembly 40b can be varied such that the shut-off valves 42a, 44b point in different directions by rotating one or both of the coupling assemblies 500b, 500c. For example, as shown in FIG. 8 both shut-off valves 42a, 44b point downward. However, the coupling assembly 500c could be rotated so that the second shut-off valve 44b points upward.

In addition, similar to the backflow prevention assembly 10 of FIGS. 1a-1d, a number of test cocks 30-1-30-4 are provided in order to measure the operating condition of the backflow prevention assemblies 40a, 40b.

Figure 9:
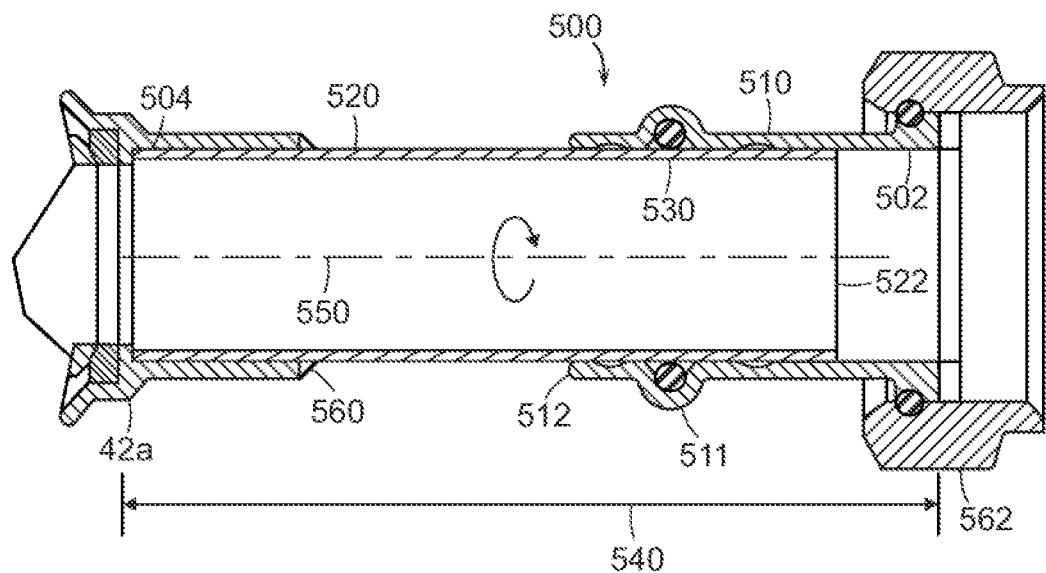
FIG. 9 illustrates a cross-sectional view of an exemplary embodiment of a coupling in accordance with the subject technology for use in the assemblies shown in FIGS. 7 and 8.

Referring now to FIG. 9, a partial cross-sectional view of an exemplary embodiment of a coupling assembly 500 in accordance with the subject technology is shown. The coupling assembly 500 is similar to the coupling assembly 100 of FIGS. 2 and 3a, and similar elements are indicated with like reference numbers in the "500" series instead of the "100" series. The coupling assembly 500 incorporates a press fitting seal ring 511 in an outer sleeve 510 that retains an O-ring 530. In one approach, the coupling assembly 500 is installed without crimping the seal ring 511. The O-ring 530 still will provide a fluid tight seal, but the sleeves 510, 520 will be allowed to slide and rotate and a length 540 will remain variable so that subsequent expansion and contraction is possible post-installation.

Alternatively, the press fitting seal ring 511 can be crimped to fix the length 540 (and rotation) of the coupling assembly 500. In the exemplary embodiment shown, a second end 504 of the coupling assembly 500 is secured to the shut-off valve 42a with solder 560, and the first end 502 of the coupling assembly 500 includes a threaded union nut 562 for connecting the coupling assembly 500 to the backflow prevention valve 44.

Figure 10:
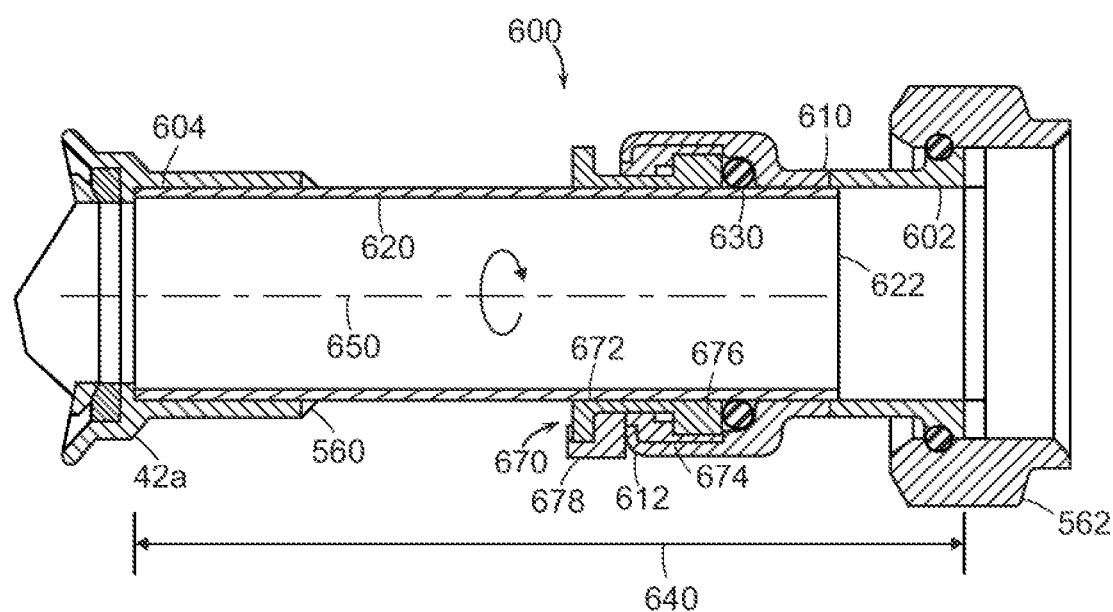
FIG. 10 illustrates a cross-sectional view of another exemplary embodiment of a coupling in accordance with the subject technology for use in the assemblies shown in FIGS. 7 and 8.

Referring now to FIG. 10, a cross-sectional view of another exemplary embodiment of a coupling assembly 600 in accordance with the subject technology is shown. The coupling assembly 600 is similar to the coupling assembly 100 of FIGS. 2 and 3a, and similar elements are indicated with like reference numbers in the "600" series instead of the "100" series. The coupling assembly 600 incorporates a quick connect fitting for coupling sleeves 610, 620 together.

In one approach, the quick connect fitting is a push-to-connect fitting 670 so that soldering, crimping or joining materials are not required. The push-to-connect fitting 670 includes a collet 672, a cap 674, an O-ring guide 676, and a clip 678 for locking the fitting. For assembly, it is only required to push the inner sleeve 620 into the outer sleeve 610. Removing the clip 678 and pushing in the collet 672 allows the sleeve 620 to be removed. Examples of push-to-connect fittings and press fittings that can be incorporated into the subject technology can be found at www.watts.com.

Figure 11:
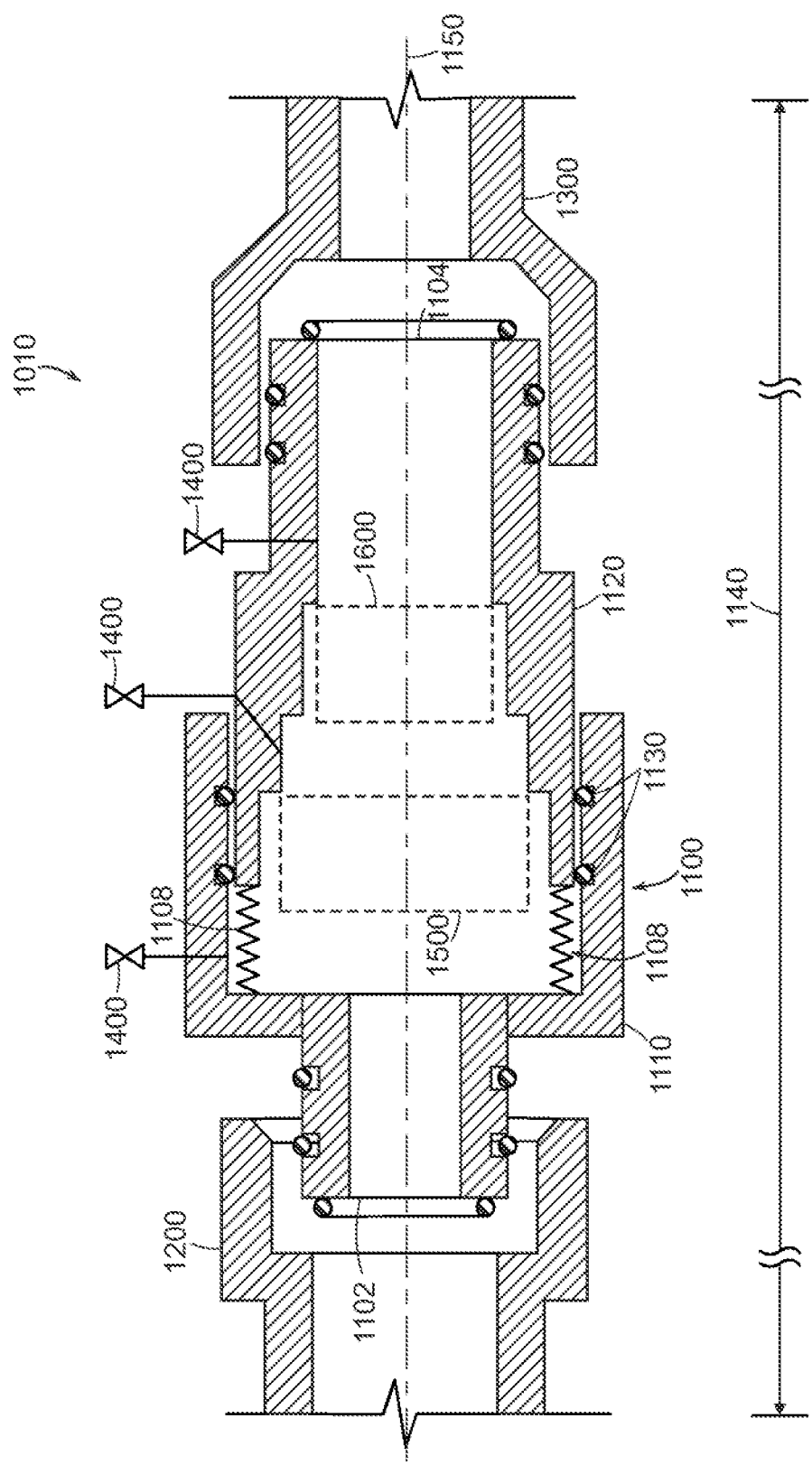
FIG. 11 illustrates an additional exemplary embodiment of a backflow prevention assembly in accordance with the subject disclosure.

Referring now to FIG. 11, another exemplary embodiment of a backflow prevention assembly 1010 is shown. The assembly 1010 includes a backflow prevention valve 1100 having an inner sleeve 1120 containing a first check valve 1500 and a second check valve 1600. The inner sleeve 1120 is slidingly received within an outer sleeve 1110 such that a lay-length 1140 of the assembly 1010 can be varied. O-rings 1130 provide a seal between the sleeves 1110, 1120 yet allow the inner sleeve 1120 to slide within the outer sleeve 1110. The sleeves 1110, 1120 may be provided with circular cross-sections so that the sleeves 1110, 1120 can rotate with respect to each other about a longitudinal axis 1150 of the assembly 1010. In alternative embodiments, the sleeves may have non-circular cross-sections to prevent such relative rotation.

The valve 1100 can include a feature for biasing the sleeves 1110, 1120 away from one another along the longitudinal axis 1150. In the exemplary embodiment, the biasing feature includes compression springs 1108 (shown schematically) positioned between the sleeves 1110, 1120. This springs 1108 may be separate from both of the sleeves 1110, 1120 or one end of a spring may be attached to one or the other of the sleeves 1110, 1120.

While a coil, or helical, spring 1108 is shown, other components or structures that store mechanical energy can be used, for example, but not limited to, a leaf spring or a cantilever spring. Further, the biasing feature may have a constant force, i.e., a forceful resistance that remains the same during a deflection cycle or a variable force, i.e., a force or resistance that varies as it is compressed.

In the exemplary embodiment shown in FIG. 11, the backflow prevention assembly 1010 includes a first coupling sleeve 1200 slidingly receiving a first end 1102 of the valve 1100 and a second coupling sleeve 1300 slidingly receiving a second end 1104 of the valve 1100. The coupling sleeves 1200, 1300 allow the lay-length 1140 the backflow prevention assembly 1010 to be further expanded. The sleeves 1110, 1120, 1200, 1300 may be provided with circular cross-sections so that the sleeves can rotate with respect to each other about the longitudinal axis 1150 of the backflow prevention assembly 1010. In alternative embodiments, one or more of the sleeves 1110, 1120, 1200, 1300 may have non-circular cross-sections to prevent such relative rotation.

Although not shown, the backflow prevention assembly 1010 may further include a feature for fixing, or locking, one or more of the sleeves 1110, 1120, 1200, 1300 in position after installation of the backflow prevention assembly 1010 in a fluid system. For example, the backflow prevention assembly 1010 could include bolts for securing the first coupling sleeve 1200 to the outer sleeve 1110 to prevent sliding or rotation between the sleeves 1200, 1110 after installation of the backflow prevention assembly 1010.

In the exemplary embodiment shown in FIG. 11, the backflow prevention assembly 1010 includes test cock valves 1400 (shown schematically). The test cock valves 1400 are for use to facilitate testing of the backflow prevention assembly 1010. During testing procedures, pressure gauges (not shown) are connected to the test cock valves 1300 and the test cock valves are opened. Backflow assemblies with test cock valves are currently designated as "testable."

Figure 12:
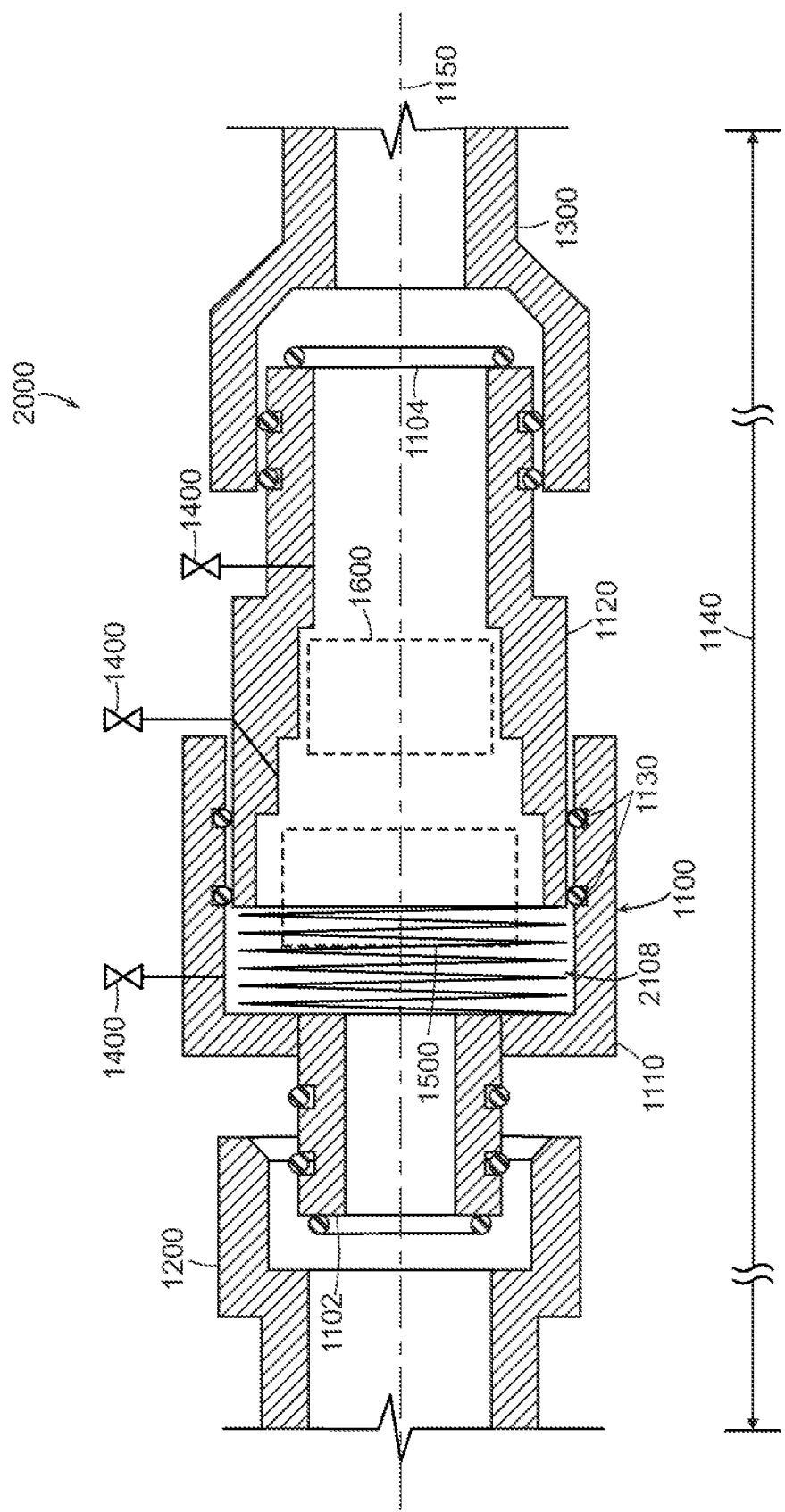
FIG. 12 illustrates an additional exemplary embodiment of a backflow prevention assembly in accordance with the subject disclosure.

Another exemplary embodiment of a backflow prevention assembly is shown in FIG. 12. The backflow prevention assembly 2000 is a variation of the assembly 1010 and has the same arrangements of components as the assembly 1010 except for the feature for biasing the sleeves 1110, 1120 away from one another along the longitudinal axis 1150. Instead of two springs 1108, the assembly 2000 includes a single spring 2108 that is sized to slidably fit within the outer sleeve 1110 to exert a force against the inner sleeve 1120 such that a lay-length 1140 of the assembly 2000 can be varied. Alternatively, the single spring 2108 can be replaced by two or more springs as would be understood by one of ordinary skill in the art. The assembly 2000 otherwise operates in the same manner as the assembly 1010.

The variable lay-length 1140 of the backflow prevention assembly 1010 expedites service (especially for those backflow assemblies currently designated as "testable") or replacement operations (especially for those backflow assemblies currently designated as "untestable"). By locking the backflow prevention assembly 1010 in an expanded position after installation (larger than that of the open pipe section, but less than that which would restrict movement at one or both ends of the assembly 1010) the backflow prevention assembly 1010 is allowed to float, or vary by length, along the longitudinal axis 1150 and between the fixed ends of a fluid system. If the sleeves 1110, 1120, 1200, 1300 include circular cross-sections, the backflow prevention assembly 1010 or parts thereof may be allowed to be rotated about the longitudinal axis 1150 between the fixed ends of a fluid system.

To perform service or replacement, one need only to push the two central sleeves 1110, 1120 together against the force of the springs 1108, allowing the valve 1100 to be removed from the coupling sleeves 1200, 1300. Once removed, the sleeves 1110, 11120 can be disassembled and the check valves 1500, 1600 removed for inspection, repair or replacement as desired. Reversing the removal steps returns the backflow prevention assembly 1010 to normal operating conditions.

In another aspect of the present disclosure, any of the foregoing assemblies can include a reduced pressure zone assembly, for example, the Series 880V MasterSeries Configurable Design Reduced Pressure Zone Assembly from Watts, provided between the check valves.

Backflow prevention valves and assemblies need to be certified by a qualified certifying agency in order to comply with various regulations. Such certifying agencies can include the Foundation for Cross-Connection Control and Hydraulic Research (FCCCHR), American Society of Sanitary Engineers (ASSE), The American Water Works Association (AWWA), The International Association of Plumbing and Mechanical Officials (IAPMO), Underwriters Laboratories (UL), and Canadian Standards Association (CSA) International, for example. The backflow prevention assemblies disclosed herein can be certified from shut-off valve to shut-off valve from the place of manufacture before they are installed in replacement sites. The certifications allow the lay-length and orientation of the assemblies to be varied by installers in the field such that the assemblies can be installed in replacement of existing assemblies that may have had a different lay-length.

The subject components may be fabricated from any suitable material or combination of materials such as lightweight stainless steel, epoxy coated carbon steel, zinc plated carbon steel, copper, copper alloys, suitable plastics and composites, and the like.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., check valves, shut-off valves, and the like) shown as distinct for purposes of illustration may be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:
1. A backflow prevention assembly, comprising:
a first shutoff valve;
a second shutoff valve;
an outer sleeve connected to one of the first and second shutoff valves, the outer sleeve having a first axis;
an inner sleeve connected to the other of the first and second shutoff valves, wherein the inner sleeve is coupled to the outer sleeve for rotation with respect to the first axis and for sliding along the first axis such that a rotational orientation and a lay-length of the backflow prevention assembly can be varied and set to a desired rotational orientation and lay-length;
a fluid seal positioned between the inner sleeve and the outer sleeve; and
a check valve, connected to the inner sleeve, configured to allow fluid flow in a single direction.

2. The backflow prevention assembly as recited in claim 1, wherein the inner sleeve has an outer diameter sized to fit within the outer sleeve for rotation about the first axis.

3. The backflow prevention assembly as recited in claim 2, wherein the outer sleeve has an inner diameter.

4. The backflow prevention assembly as recited in claim 3, wherein a portion of the inner diameter of the outer sleeve has a narrowed inner diameter that forms a minimum lay-length travel stop.

5. The backflow prevention assembly as recited in claim 1, wherein the backflow prevention assembly retains certification thereof from a qualified certifying agency for any lay-length and rotational orientation of the inner sleeve positioned with respect to the outer sleeve.

6. The backflow prevention assembly as recited in claim 1, further comprising a spring configured to bias the inner and outer sleeves away from one another along a common axis to the sleeves.

7. A backflow prevention assembly, comprising:
a first shutoff valve;
a second shutoff valve;
an outer sleeve connected to one of the first and second shutoff valves, the outer sleeve having a first axis;
an inner sleeve connected to the other of the first and second shutoff valves, wherein the inner sleeve is configured to couple to the outer sleeve for sliding along the first axis such that a lay-length of the backflow prevention assembly can be varied and set to a desired rotational orientation and lay-length; and
a check valve, connected to the inner sleeve, configured to allow fluid flow in a single direction.

8. The backflow prevention assembly as recited in claim 7, wherein the inner sleeve and the outer sleeve have a cross-sectional shape to prevent rotation about the first axis.

9. The backflow prevention assembly as recited in claim 8, wherein the cross-sectional shape is oval.

10. The backflow prevention assembly as recited in claim 8, wherein the outer sleeve has an inner diameter without threads and the inner sleeve has a smooth outer diameter sized to fit within the smooth inner diameter of the outer sleeve.

11. The backflow prevention assembly as recited in claim 7, wherein a portion of the inner diameter of the outer sleeve has a narrowed inner diameter that forms a minimum lay-length travel stop.

12. The backflow prevention assembly as recited in claim 7, wherein the backflow prevention assembly retains certification thereof from a qualified certifying agency for any lay-length and rotational orientation of the inner sleeve positioned with respect to the outer sleeve.

13. The backflow prevention assembly as recited in claim 7, further comprising a spring configured to bias the inner and outer sleeves away from one another along a common axis to the sleeves.

* * * * *